United States Patent
Ryu et al.

(10) Patent No.: US 11,558,840 B2
(45) Date of Patent: Jan. 17, 2023

(54) TIMING ADVANCES FOR UPLINK TRANSMISSIONS

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Junyi Li, Chester, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/709,335

(22) Filed: Dec. 10, 2019

(65) Prior Publication Data

US 2020/0196265 A1 Jun. 18, 2020

Related U.S. Application Data

(60) Provisional application No. 62/780,824, filed on Dec. 17, 2018.

(51) Int. Cl.
*H04W 4/00* (2018.01)
*H04W 56/00* (2009.01)
(Continued)

(52) U.S. Cl.
CPC ....... *H04W 56/0045* (2013.01); *H04L 5/0082* (2013.01); *H04W 16/28* (2013.01);
(Continued)

(58) Field of Classification Search
None
See application file for complete search history.

(56) References Cited

U.S. PATENT DOCUMENTS

| 5,812,544 A * | 9/1998 | Dent | H04W 16/26 370/347 |
| 6,047,181 A * | 4/2000 | Suonvieri | H04W 16/26 455/436 |

(Continued)

OTHER PUBLICATIONS

Asustek., "Discussion on Timing Advance in NR", 3GPP Draft, 3GPP TSG-RAN WG2 Meeting #100, R2-1712211, 3rd Generation Partnership Project (3GPP) Mobile Competence Centre, 650 Route Des Lucioles, F-06921 Sophia-Antipolis Cedex, France, vol. RAN WG2, No. Reno, USA, Nov. 27, 2017-Dec. 1, 2017, Nov. 16, 2017 (Nov. 16, 2017), XP051370918, 2 pages, Retrieved from the Internet:URL: http://www.3gpp.org/ftp/tsg%5Fran/WG2%5FRL2/TSGR2%5F100/Docs/. [retrieved on Nov. 16, 2017] the whole document.

(Continued)

*Primary Examiner* — Clemence S Han
(74) *Attorney, Agent, or Firm* — Danai Nelisile Mhembere; Patterson & Sheridan, LLP

(57) ABSTRACT

Certain aspects of the present disclosure provide techniques for using multiple timing advances for simultaneous uplink reception, for example, using multiple antennas, beams, and/or antenna panels. A method that may be performed by a user equipment (UE) includes configuring a plurality of timing advances (TAs) for a plurality of uplink transmissions using a plurality of antennas. The UE transmits the plurality of uplink transmissions to a base station (BS) using the plurality of antennas based on the plurality of timing advances. A method that may be performed by a BS includes receiving a plurality of uplink transmissions from a UE and transmitting timing information to the UE in a message, the timing information based on when each of the plurality of uplink transmissions was received at the BS.

31 Claims, 11 Drawing Sheets

(51) Int. Cl.
  *H04W 72/04* (2009.01)
  *H04W 16/28* (2009.01)
  *H04L 5/00* (2006.01)
  *H04W 80/02* (2009.01)
  *H04W 76/27* (2018.01)
(52) U.S. Cl.
  CPC ....... *H04W 72/042* (2013.01); *H04W 72/046* (2013.01); *H04W 76/27* (2018.02); *H04W 80/02* (2013.01)

(56) References Cited

U.S. PATENT DOCUMENTS

| | | | | |
|---|---|---|---|---|
| 7,979,090 | B2* | 7/2011 | Alm | H04B 7/0408 455/562.1 |
| 9,661,612 | B2* | 5/2017 | Josiam | H04L 5/0094 |
| 9,867,190 | B1* | 1/2018 | Sinnaduray | H04W 52/283 |
| 2002/0002066 | A1* | 1/2002 | Pallonen | G01S 3/28 455/562.1 |
| 2003/0026215 | A1* | 2/2003 | Schafer | H04J 3/0682 370/280 |
| 2008/0085715 | A1* | 4/2008 | Alm | H04B 7/0617 455/450 |
| 2013/0301619 | A1* | 11/2013 | Singh | H04W 56/0045 370/336 |
| 2014/0016620 | A1* | 1/2014 | Singh | H04L 5/0078 370/336 |
| 2018/0027555 | A1* | 1/2018 | Kim | H04B 7/022 370/329 |
| 2018/0084546 | A1* | 3/2018 | Guo | H04W 56/0015 |
| 2018/0235013 | A1* | 8/2018 | Jung | H04W 74/006 |
| 2019/0081753 | A1* | 3/2019 | Jung | H04B 7/063 |
| 2019/0215048 | A1* | 7/2019 | Cirik | H04B 7/088 |
| 2019/0349964 | A1* | 11/2019 | Liou | H04L 5/001 |
| 2020/0083939 | A1* | 3/2020 | Park | H04W 72/1268 |
| 2020/0106168 | A1* | 4/2020 | Hakola | H04B 7/0695 |
| 2020/0343950 | A1* | 10/2020 | Zhu | H04L 5/005 |
| 2020/0389885 | A1* | 12/2020 | Tomeba | H04W 88/02 |
| 2020/0412437 | A1* | 12/2020 | Cirik | H04L 5/0048 |
| 2021/0168714 | A1* | 6/2021 | Guan | H04B 7/0691 |
| 2021/0168839 | A1* | 6/2021 | Su | H04L 5/00 |
| 2021/0184819 | A1* | 6/2021 | Takeda | H04W 72/0413 |

OTHER PUBLICATIONS

Huawei, et al., "Considerations on Timing Advance Design in NR", 3GPP Draft, 3GPP TSG RAN WG1 Meeting #91, R1-1719810, 3rd Generation Partnership Project (3GPP) Mobile Competence Centre, 650 Route Des Lucioles, F-06921 Sophia-Antipolis Cedex, France, vol. RAN WG1, No. Reno, USA; Nov. 27, 2017-Dec. 1, 2017, Nov. 17, 2017 (Nov. 17, 2017), XP051369188, 3 pages, Retrieved from the Internet: URL: http://www.3gpp.org/ftp/tsg%5Fran/WG1%5FRL1/TSGR1%5F91/Docs/. [retrieved on Nov. 17, 2017] the whole document.
NTT Docomo et al., "TA Maintenance for CA", 3GPP Draft, 3GPP TSG-RAN2#68bis, R2-100472, 3rd Generation Partnership Project (3gpp), Mobile Competence Centre, 650, Route Des Lucioles, F-06921 Sophia-Antipolis Cedex, France, vol. RAN WG2, No. Valencia, Spain, Jan. 18, 2010, Jan. 12, 2010 (Jan. 12, 2010), XP050421108, 4 pages, [retrieved on 2010-81-12] the whole document.
Partial International Search Report—PCT/US2019/065594—ISA/EPO—dated Feb. 28, 2020.
Huawei, et al., "Discussion on NOMA Related Procedures", 3GPP Draft, 3GPP TSG RAN WG1 Meeting #94bis, R1-1810118, (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517533, 10 pages, URL: http://www.3gpp.org/ftp/tsg%5Fran/WG1%5FRL1/TSGR1%5F94b/Docs/R1%2D1810118%2Ezip. [retrieved on Sep. 29, 2018] the whole document.
Intel Corporation: "Discussion on Multi-Panel and Multi-TRP Operation", 3GPP Draft, 3GPP TSG RAN WG1 Meeting NR#3, R1-1716289, Discussion on Multi-Panel and Multi-TRP Operation, (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339745, 6 pages, URL: Multiple uplink signals. http://vww.3gpp.org/ftp/Meetings_3GPP_SYNC/RAN1/Docs/.
International Search Report and Written Opinion—PCT/US2019/065594—ISA/EPO—dated May 15, 2020.

* cited by examiner

TIMING ADVANCES FOR UPLINK TRANSMISSIONS

CROSS-REFERENCE TO RELATED APPLICATION(S)

This application claims benefit of and priority to U.S. Provisional Application No. 62/780,824, filed Dec. 17, 2018, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for uplink transmission.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes configuring a plurality of timing advances (TAs) for a plurality of uplink transmissions using a plurality of antennas. The method generally includes transmitting the plurality of uplink transmissions to a base station (BS) using the plurality of antennas based on the plurality of timing advances.

Certain aspects provide a method for wireless communication by a BS. The method generally includes receiving a plurality of uplink transmissions from a UE. The method generally includes transmitting timing information to the UE in a message, the timing information being based on when each of the plurality of uplink transmissions was received by the BS.

Certain aspects provide an apparatus for wireless communication. The apparatus generally includes means for configuring a plurality of TAs for a plurality of uplink transmissions using a plurality of antennas. The apparatus generally includes means for transmitting the plurality of uplink transmissions to a BS using the plurality of antennas based on the plurality of timing advances.

Certain aspects provide an apparatus for wireless communication. The apparatus generally includes means for receiving a plurality of uplink transmissions from a UE. The apparatus generally includes means for transmitting timing information to the UE in a message, the timing information being based on when each of the plurality of uplink transmissions was received by the apparatus.

Certain aspects provide an apparatus for wireless communication. The apparatus generally includes a memory and at least one processor coupled with the memory. The memory and processor are configured to configure a plurality of TAs for a plurality of uplink transmissions using a plurality of antennas and transmit the plurality of uplink transmissions to a BS using the plurality of antennas based on the plurality of timing advances.

Certain aspects provide an apparatus for wireless communication. The apparatus generally includes a memory and at least one processor coupled with the memory. The memory and processor are configured to receive a plurality of uplink transmissions from a UE and transmit timing information to the UE in a message, the timing information being based on when each of the plurality of uplink transmissions was received by the apparatus.

Certain aspects provide a computer readable medium storing computer executable code thereon for wireless communication. The computer readable medium generally includes code for configuring a plurality of TAs for a plurality of uplink transmissions using a plurality of antennas. The computer readable medium generally includes transmitting the plurality of uplink transmissions to a BS using the plurality of antennas based on the plurality of timing advances.

Certain aspects provide a computer readable medium having computer executable code stored thereon for wireless communication. The computer readable medium generally includes code for receiving a plurality of uplink transmissions from a UE. The computer readable medium generally includes code for transmitting timing information to the UE in a message, the timing information being based on when each of the plurality of uplink transmissions was received by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
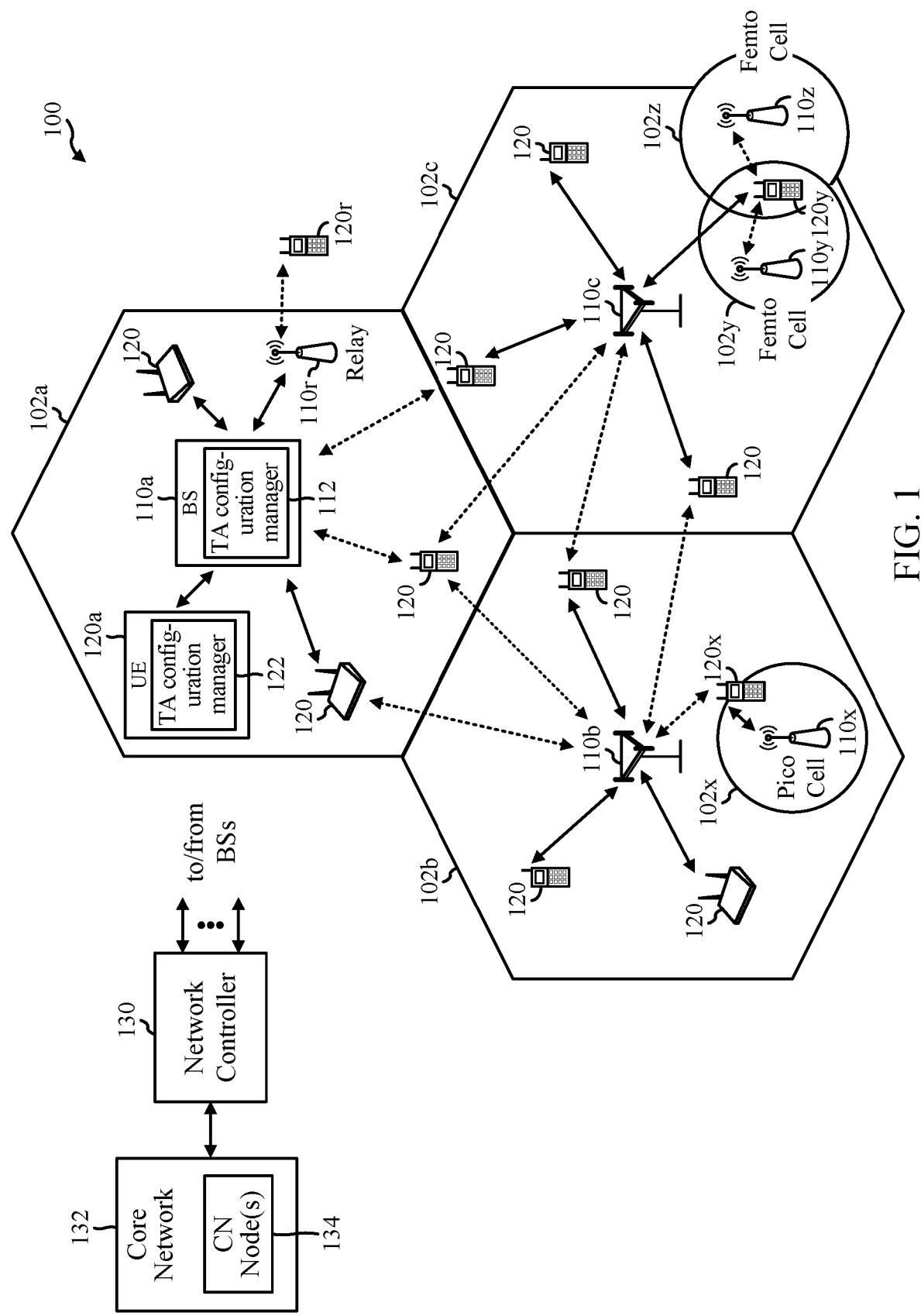
FIG. 1 is a block diagram conceptually illustrating an example telecommunications system, in accordance with certain aspects of the present disclosure.

Aspects of the present disclosure provide apparatus, methods, processing systems, and computer readable mediums for using multiple timing advances (TAs) for uplink transmissions, for example, using multiple antennas, beams, and/or antenna panels. The multiple TAs may be configured such that the uplink transmissions by a user equipment (UE) are received simultaneously (e.g., in a same transmission time interval (TTI)) by a base station (BS).

In certain systems, a UE may be able to transmit uplink signals concurrently using multiple antennas, beams, and/or antenna panels (e.g., antenna arrays) to a serving BS. Because the multiple UE antennas, beams, and/or antenna panels used for the uplink transmissions may point in different directions, the transmissions follow different signal paths and, therefore, may travel different distances and have different propagation delays. Thus, the signals from the different antennas, beams, and/or antenna panels may be transmitted at the same time, but the signals arrive at the BS at different times due to the different propagation delays, which is undesirable. Therefore, techniques that allow different uplink transmissions to arrive at the BS at the same time is desired.

Accordingly, aspects of the present disclosure provide for multiple TAs to be used for uplink transmissions via different antennas, beams, and/or antenna panels, such that the uplink transmissions may arrive at the serving BS simultaneously, even though they may have different propagation delays. Thus, reception at the BS can be improved.

The following description provides examples of timing advances for uplink transmissions, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, 5G NR RAT networks may be deployed.

5G NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may support beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a 5G NR network. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a cell may, which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r) that receives a transmission of data and/or other information from an upstream station (e.g., a BS 110a or a UE 120r) and send a transmission of the data and/or other information to a downstream station (e.g., a UE 120 or a BS 110), or that relays transmissions between UEs 120 to facilitate communication between devices.

According to certain aspects, the UEs 120 may be configured for multi-panel simultaneous uplink transmission with the BSs 110. As shown in FIG. 1, the UE 120a has a TA configuration manager that may be configured for configuring a plurality of TAs for a plurality of uplink transmissions using a plurality of antennas, according to aspects described herein. The TAs may be indicated to the UE 120a by the BS 110a or configured based on timing information received from the BS 110a. For example, as shown in FIG. 1, the BS 110a has a timing information manager that may be configured for receiving a plurality of uplink transmissions from the UE 120a and transmitting timing information to the UE 120a, the timing information being based on when each of the plurality of uplink transmissions was received, according to aspects described herein. The TAs may be configured such that the uplink transmission from the plurality of antennas arrives at the BS 110a simultaneously as discussed in more detail herein.

Figure 2:
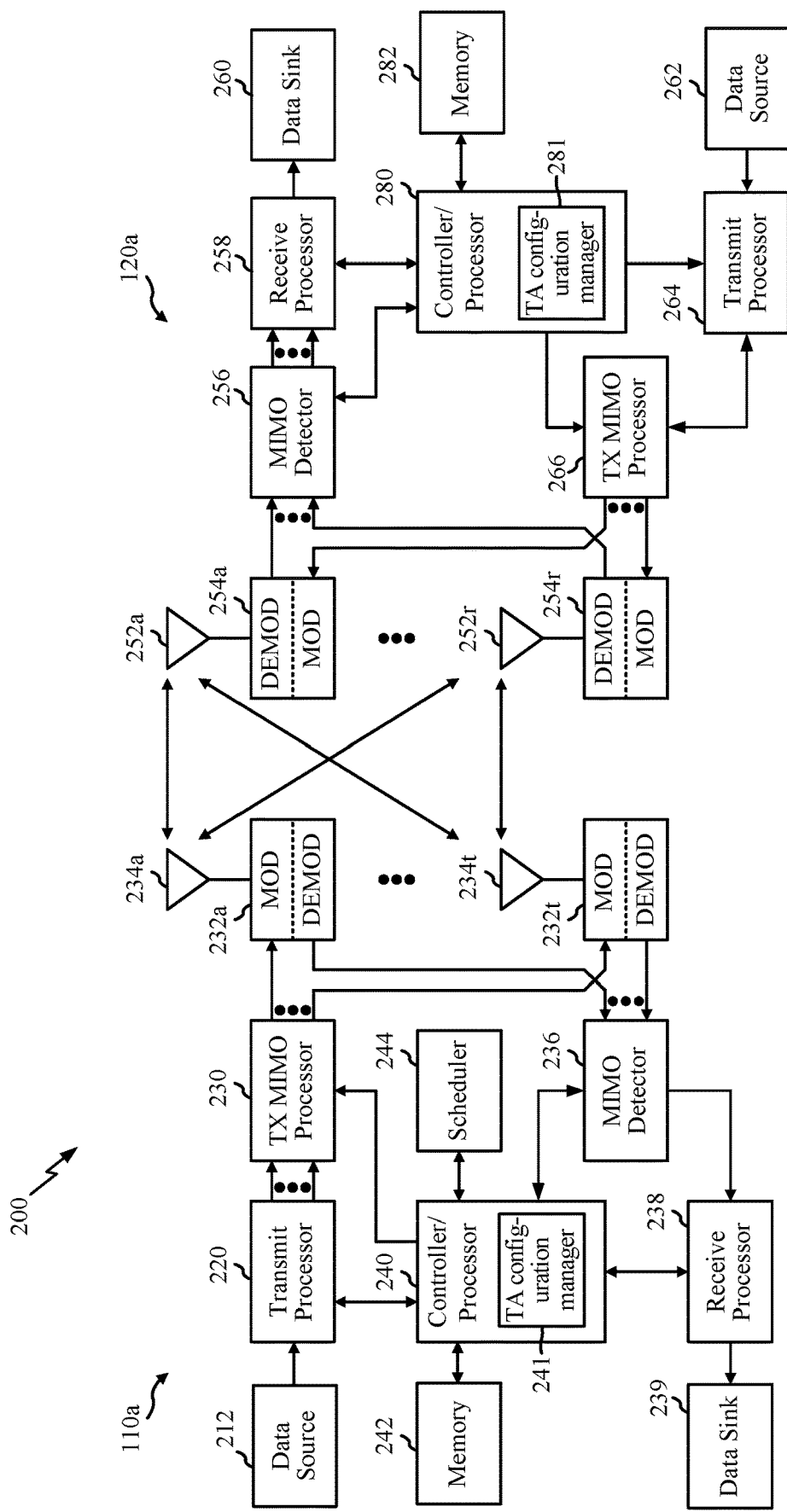
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a* through 254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. As shown in FIG. 2, the processor 240 at the BS 110*a* has a timing information manager that may be configured for using timing advances for uplink transmissions, according to aspects described herein. As shown in FIG. 2, the processor 280 at the UE 120*a* has a TA configuration manager that may be configured for using timing advances for uplink transmissions, according to aspects described herein. The memories 242 and 282 may store data and program codes for BS 110*a* and UE 120*a*, respectively. A scheduler 244 may schedule UEs for data transmission on the downlink and/or uplink.

NR may utilize orthogonal frequency division multiplexing (OFDM) with a cyclic prefix (CP) on the uplink and/or downlink and/or single-carrier frequency division multiplexing (SC-FDM) on the uplink. NR may support half-duplex operation using time division duplexing (TDD). OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The NR resource block (RB) may be 12 consecutive frequency subcarriers. NR may support a base subcarrier spacing (SCS) of 15 KHz and other SCS may be defined with respect to the base SCS (e.g., 30 kHz, 60 kHz, 120 kHz, 240 kHz, etc.). The system bandwidth may also be partitioned into subbands. For example, a subband may cover multiple RBs.

Figure 3:
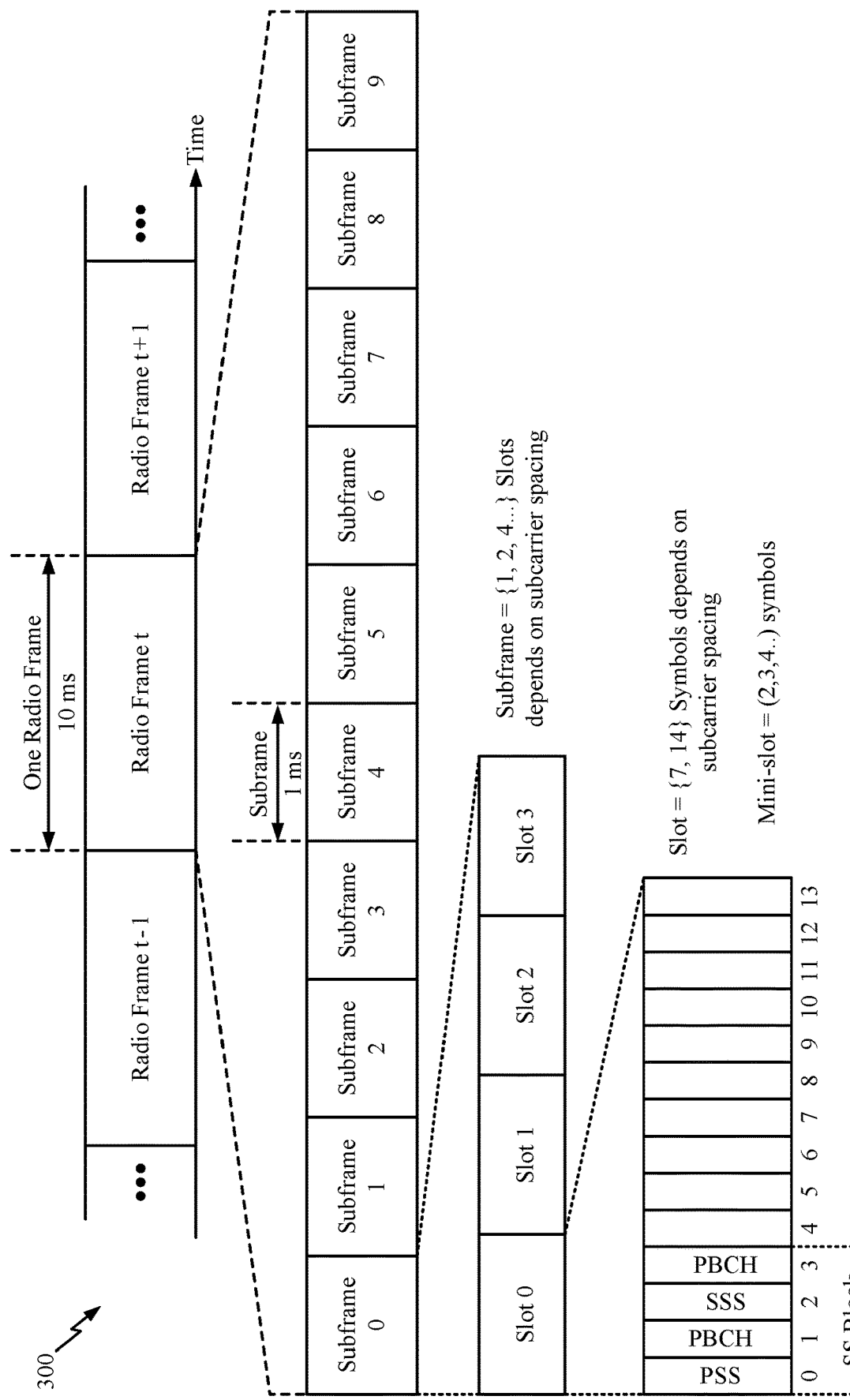
FIG. 3 illustrates an example of a frame format for a new radio (NR) system, in accordance with certain aspects of the present disclosure.

In NR, a subframe is 1 ms, but the basic TTI is referred to as a slot. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In certain systems, a user equipment (UE) may be able to transmit uplink signals using multiple antennas, beams, antenna panels (e.g., antenna arrays). The uplink transmissions may be to the serving base station (BS). The uplink transmissions may allow increased throughput (e.g., by simultaneously or concurrently transmitting data to the BS using the multiple antennas, beams, and/or panels) and/or increased reliability (e.g., by sending the same information from the multiple antennas, beams, and/or panels). Such transmissions may be referred to as multi-panel uplink transmissions.

In certain systems, such as new radio (e.g., 5G NR systems), multi-panel uplink transmission may be configured for physical uplink shared channel (PUSCH) and/or sounding reference signal (SRS) transmissions by the UE. In some examples, the UE is configured with one or more SRS resource sets configuring SRS resources for SRS transmission. Each SRS resource set may be associated with a UE antenna panel for both codebook-based (e.g., beamformed) and non-codebook based (e.g., non-beamformed) PUSCH transmission. In some examples, the SRS resource indicator (SRI) field in downlink control information (DCI) may be used to indicate (by the BS) and select (by the UE) SRS resources from the configured SRS resource sets. For example, the BS and UE may be configured with a table or mapping of the SRI field (e.g., SRI values) to which SRS resource from which SRS resource set is to be used for a multi-panel uplink transmission. In some examples, the SRI in the DCI may indicate multiple SRS resources from one SRS resource set. In some examples, of the multiple SRS resources indicated by the BS, the UE may select one to use for uplink transmission.

The different antennas, beams, and/or antenna panels may cover different spatial directions. However, because the multiple UE antenna panels and/or beams for the transmission may point in different directions, the transmissions follow different signal paths and, therefore, may travel different distances and have different propagation delays. Thus, signals from the different antennas, beams, and/or antennas transmitted at the same time may arrive at the BS at different times due to the different propagation delays. In an example shown in FIG. 4, a first uplink transmission 402 from the UE using a first antenna, beam, and/or antenna panel (shown as the solid line arrows in FIG. 4) is transmitted at the same time as a second uplink transmission 404 from the UE using a second antenna, beam, and/or antenna panel (shown as the dotted line arrows in FIG. 4), the first and second uplink transmissions having different signal paths with different propagation delays (delay1 and delay2) and arriving at the BS at different times (t1 and t2).

Figure 4:
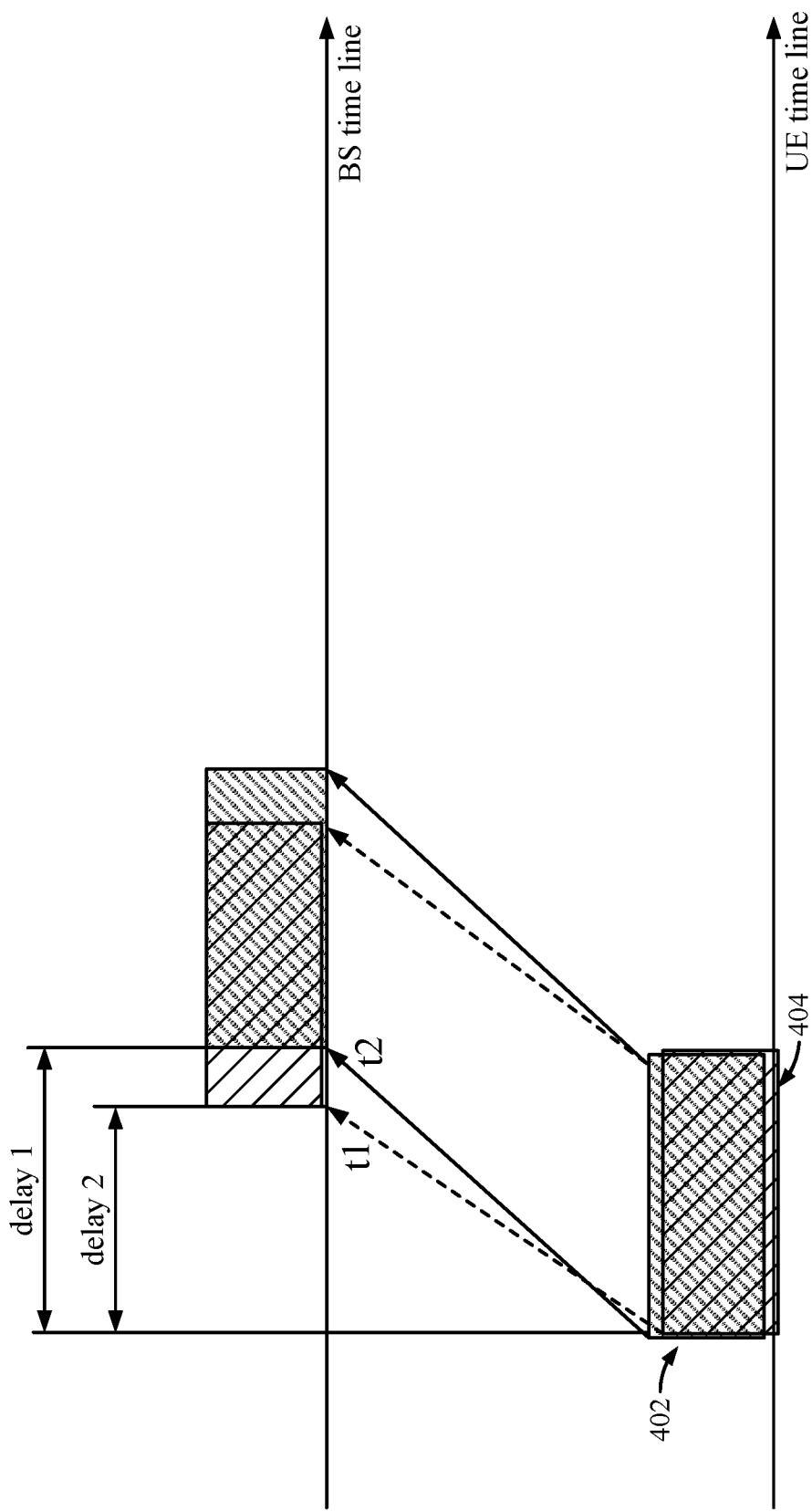
FIG. 4 is a BS and UE signaling timeline illustrating different arrival times at the BS in a multi-panel uplink transmission scenario, in accordance with certain aspects of the present disclosure.
Figure 5:
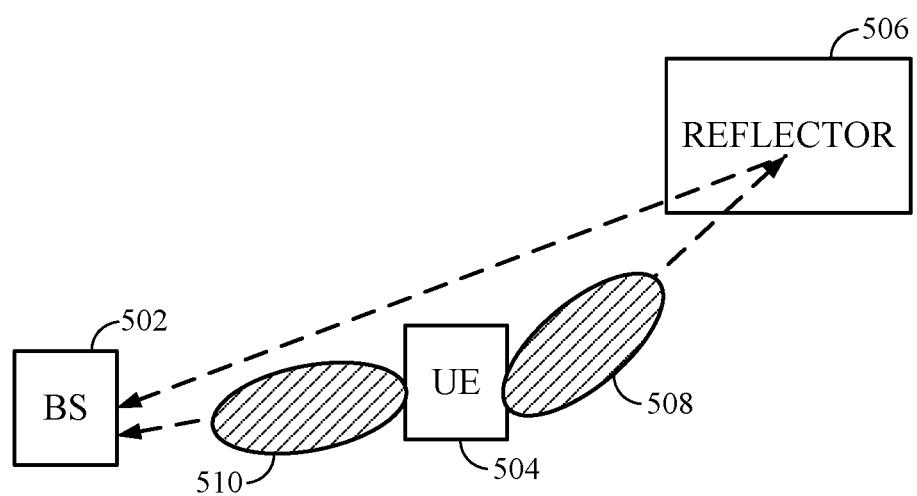
FIG. 5 illustrates a multi-panel uplink transmission scenario, in accordance with certain aspects of the present disclosure.

FIG. 4 is an example of uplink transmissions with different arrival times at the BS. FIG. 5 illustrates an example multi-panel uplink transmission scenario that may lead to different arrival times for different uplink transmissions, in accordance with certain aspects of the present disclosure. As shown in FIG. 5, the UE 504 may simultaneously transmit a first uplink transmission 510 in a first direction (e.g., using a front antenna panel and/or a first beam direction) and a second uplink transmission 508 in a second direction (e.g., using a back antenna panel and/or a second beam direction). As shown in FIG. 5, the first uplink transmission 510 may be directed generally towards the serving BS 502, while the second uplink transmission 508 is generally directed in a different direction but is reflected to the serving BS 502 (e.g., by the signal reflector 506). Thus, in the example shown in FIG. 5, the first uplink transmission 510 follows a shorter path than the second uplink transmission 508 from the UE 504. Therefore, although the uplink transmissions 510 and 508 are transmitted at the same time, they arrive at the BS 502 at different times (e.g., the first uplink transmission 510 arrives at the BS 502 before the second uplink transmission 508 arrives at the BS 502).

Figure 6:
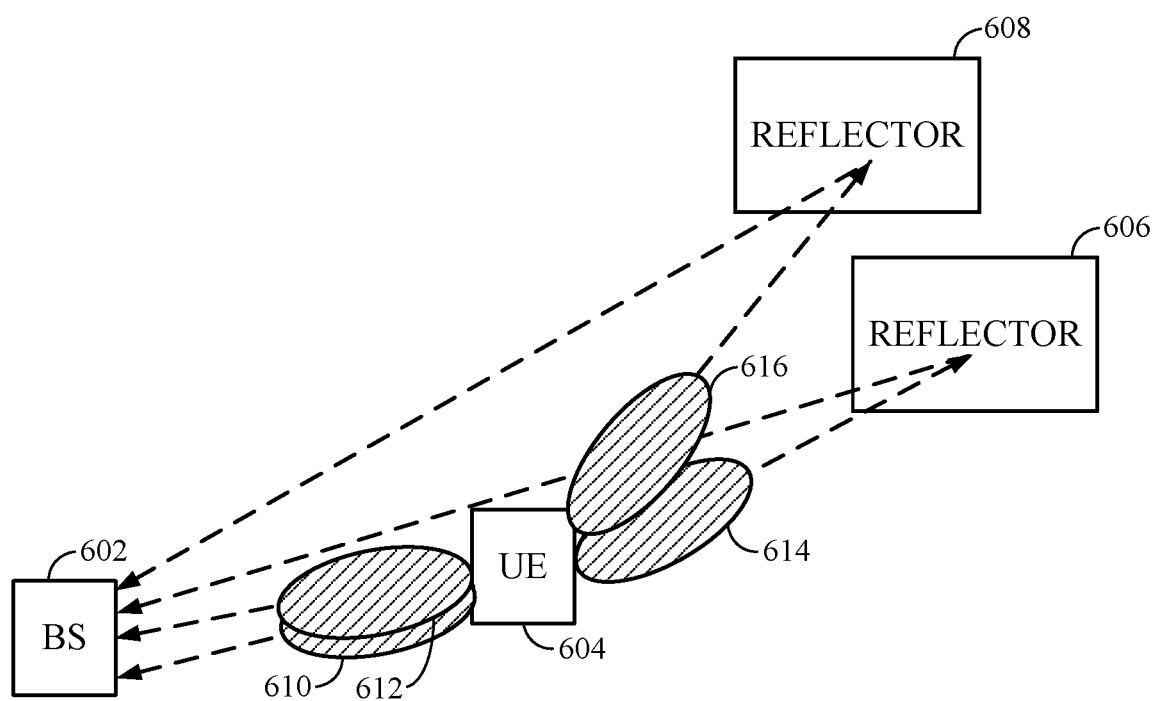
FIG. 6 illustrates another multi-panel uplink transmission scenario, in accordance with certain aspects of the present disclosure.

The uplink transmission scenario illustrated in FIG. 5 is merely illustrative of a scenario with simultaneous uplink transmissions arriving at a BS at different times. Various different scenarios can also lead to different signal path and propagation delays of different uplink signals transmitted from the UE via different antennas, antenna beams, and/or antenna panels. For example, a BS and/or a UE may include any number of arrays, antennas, antenna panels, and arrays and/or antenna panels including any number of antennas, as well as antennas, panels, and/or arrays arranged at various locations on the BS and/or UE (e.g., on the front, sides, and/or back). Further, the UE may transmit any number of uplink transmissions transmitted via the multiple antennas, arrays, beams, and/or antenna panels. Also, there may be multiple different signal reflectors, at multiple different possible locations in the system, that reflect signals in any of various directions, and any one signal could be reflected via multiple signal reflectors. For example, FIG. 6 illustrates another multi-panel uplink transmission scenario, in which the UE 604 transmits two uplink transmissions 610 and 612 generally in the direction of the BS 602 (e.g., via two front panels or two beams directed at the BS 602) and two uplink transmissions 614 and 616 in different directions (e.g., via two back panels or two beams directed away from the BS 602), where the uplink transmissions 614 and 616 are reflected towards the BS 602 by two different signal reflectors 606 and 608.

Techniques for simultaneous uplink reception are desired.

Example Timing Advances for Simultaneous Uplink Reception

Timing advances (TAs) can be used to control uplink signal timing. Based on a TA, a user equipment (UE) may delay (e.g., send late) an uplink transmission or advance the uplink transmission (e.g., send early) by some amount. However, if the same TA advance is applied for uplink transmission by a UE via multiple antennas, beams, and/or antenna panels to a base station (BS), then the uplink transmissions will still arrive at the BS at different times. For example, if the TA is based on the shorter signal path (from among the signals paths for the uplink transmissions via the different antennas, beams, and/or antenna panels), then signals traveling on the longer paths may arrive at the BS past the allotted reception window. In some examples, if the same TA is used for all of the uplink transmissions, the signals arriving at the BS at different times may combine at the BS through multiple taps, creating undesirable distortion in the frequency domain.

Aspects of the present disclosure provide for multiple TAs to be used for uplink transmissions via different antennas, beams, and/or antenna panels, such that the uplink transmissions (e.g., sent concurrently) may arrive at the serving BS simultaneously, even though they may have different propagation delays. Thus, reception at the BS can be improved.

As used herein, concurrent uplink transmission by the UE refers to the uplink transmissions, that are transmitted (and/or scheduled) close in time (e.g., in a same transmission time interval (TTI)), such as during an overlapping time period. As used herein, simultaneously received uplink transmissions may refer to uplink transmissions that arrive at the BS simultaneously or near simultaneously (e.g., within a same TTI).

Figure 7:
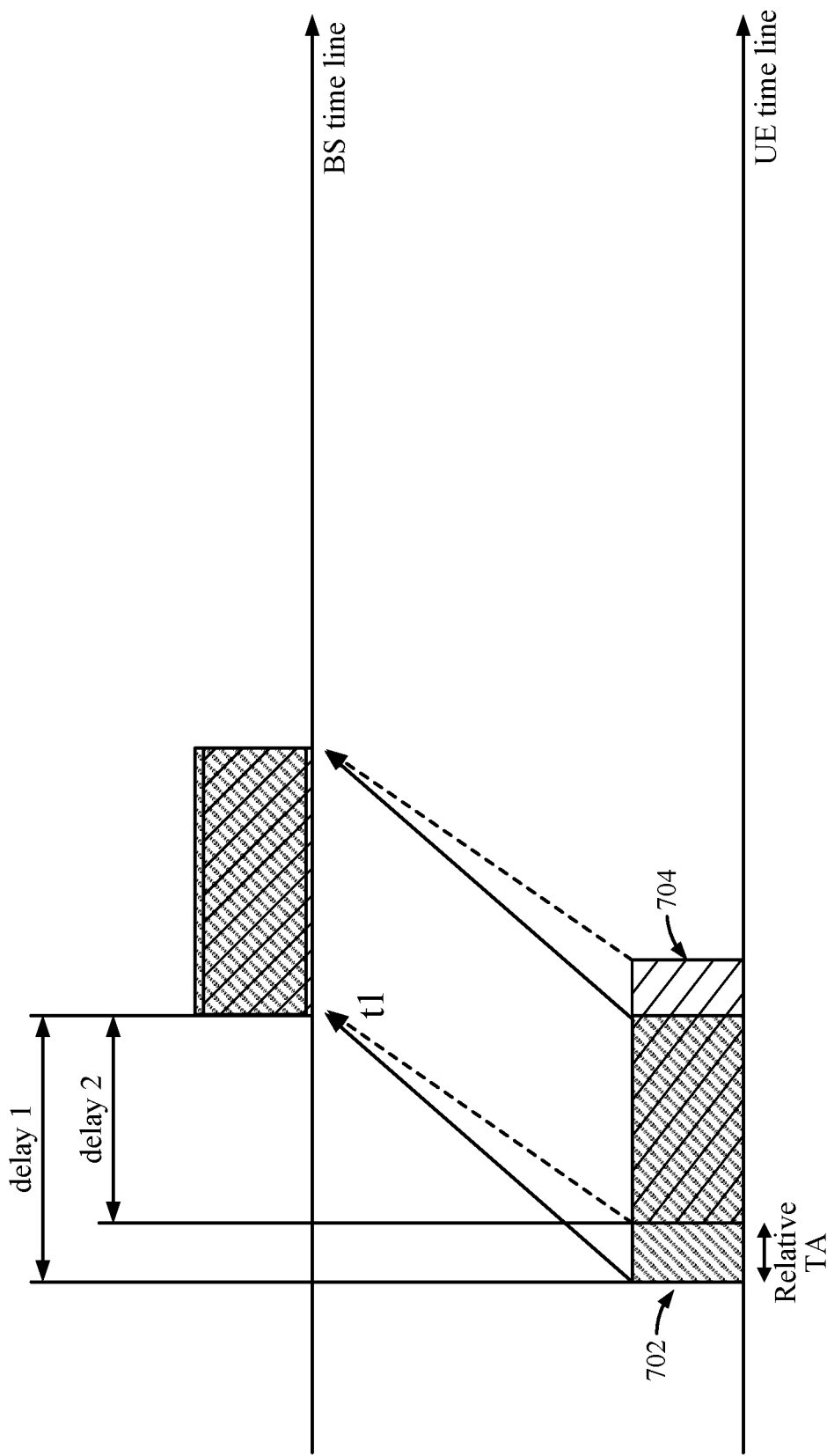
FIG. 7 is a BS and UE signaling timeline illustrating different arrival times at the BS in a multi-panel uplink transmission scenario with different timing advances (TAs), in accordance with certain aspects of the present disclosure.

FIG. 7 illustrates an example of different TAs for different uplink transmissions with different signal paths, such that the uplink transmissions arrive simultaneously at the BS. As shown in FIG. 7, a first uplink transmission 702 from the UE using a first antenna, beam, and/or antenna panel (shown as the solid line arrows in FIG. 7) may be transmitted with a different TA relative to a TA for a second uplink transmission 704 from the UE using a second antenna, beam, and/or antenna panel (shown as the dotted line arrows in FIG. 7). Thus, although the uplink transmissions 702 and 702 have different signal paths with different propagation delays (delay 1 and delay 2), the uplink transmissions 702 and 704 arrive at the BS at the same time (t1).

According to certain aspects, the UE selects a TA to apply for each of the uplink transmissions using the different antenna, beams, and/or antenna panels. In some examples, the UE receives timing information from the BS. For example, the UE may receive timing information associated with the different antennas, beams, and/or antenna panels. In some examples, the UE receives TA commands, or relative TA commands, from the BS for the different antennas, beams, and/or panels. In some examples, the timing information and/or TA commands from the BS are based on previous uplink transmissions from the UE using the antennas, beams, and/or antenna panels. For example, the UE may initially transmit concurrent uplink transmissions using the plurality of antennas, beams, and/or antenna panels with a common TA. The common TA may be selected by the UE or determined during initial access (e.g., via random access channel (RACH) signals using the antennas, beams, and/or antenna panels). If the BS sees that initial uplink transmissions are arriving at different times (e.g., and causing distortion), the BS can calculate TA values for the different antennas, beams, and/or antenna panels (e.g., to account for the relative timing differences at which the signals are received). In some examples, the BS can identify the antenna, beam, and/or antenna panel used for the uplink transmission by the BS and indicate the relative timings for the different antennas, beams, and/or antenna panels to the UE. The UE can apply the relative TA values the next time it transmits from the multiple antennas, beams, and/or antenna panels. In some examples, the UE applies the TAs according to TA commands from the BS. In some examples, based on timing information received from the BS, the UE can determine the TAs to apply.

The geometry of the system may change over time. For example, the UE may be in motion and/or various signal reflectors may be in motion. Thus, the corresponding signal paths associated with the UE antennas, beams, and/or antenna panels can also change over time. Therefore, the TAs used for the uplink transmissions may also be updated over time. For example, the BS can continue to monitor the relative timings and send updated timing information and/or TAs to the UE.

Figure 8:
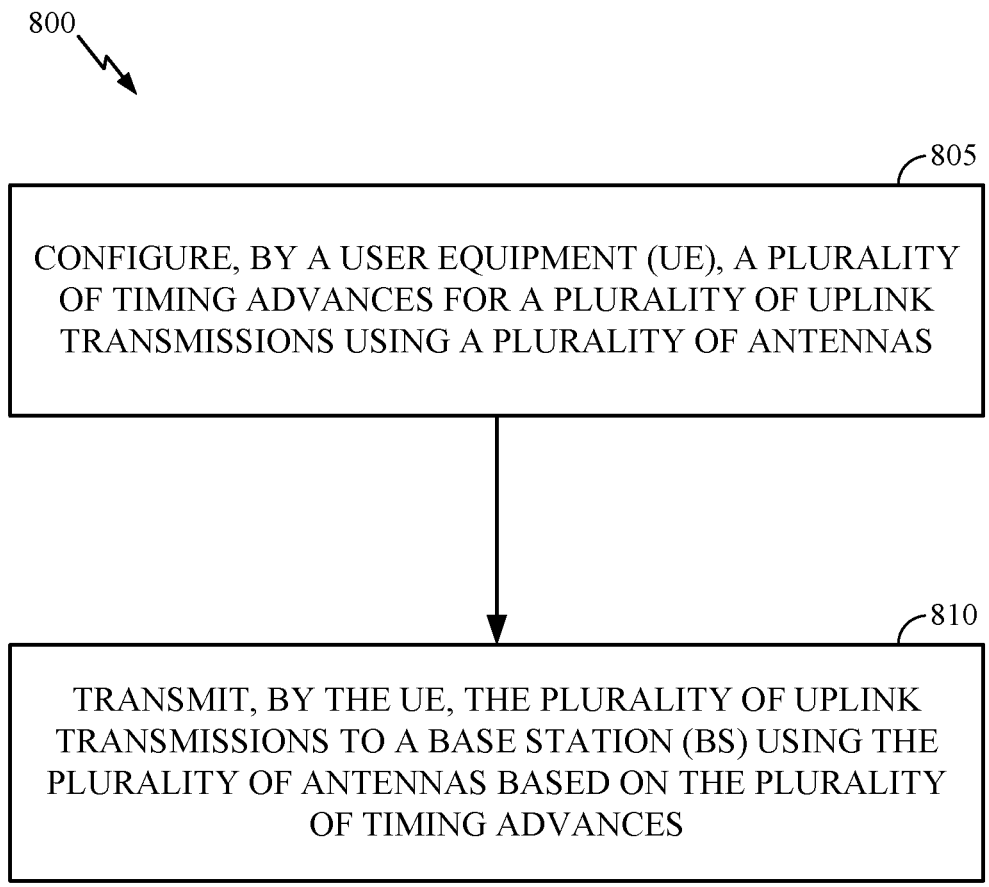
FIG. 8 is a flow diagram illustrating example operations by a UE for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100). Operations 800 may be implemented as software components that are executed and run on one or more processors (e.g., processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

The operations 800 may begin, at 805, by determining a plurality of timing advances for a plurality of uplink transmissions (e.g., PUSCH and/or SRS transmissions) using a plurality of antennas. In some examples, the plurality of antennas may use different beams in different beamformed directions. In some examples, the plurality of antennas are located on a plurality of antenna panels (e.g., which may be on the front, back, and/or sides of the UE).

According to certain aspects, the plurality of TAs (e.g., different TAs of different amounts) are determined, and applied to the uplink transmissions, such that the plurality of uplink transmissions arrive at the BS simultaneously (e.g., in a same TTI).

According to certain aspects, the UE receives receiving a message from the BS including timing information of previously received uplink transmissions associated with the plurality of antennas and determines the plurality of TAs based on the indication from the BS. In some examples, the timing information is TA commands for the antennas, beams, and/or antenna panels. The message may be received via downlink control information (DCI), a medium access control (MAC) control element (CE), or a radio resource control (RRC) configuration.

At 810, the UE transmits the plurality of uplink transmissions to a BS (e.g., the serving BS), using the plurality of antennas (e.g., with different beamforming directions and/or different antenna panels) based on the plurality of TAs. The plurality of uplink transmissions may carry the same or different information.

Figure 9:
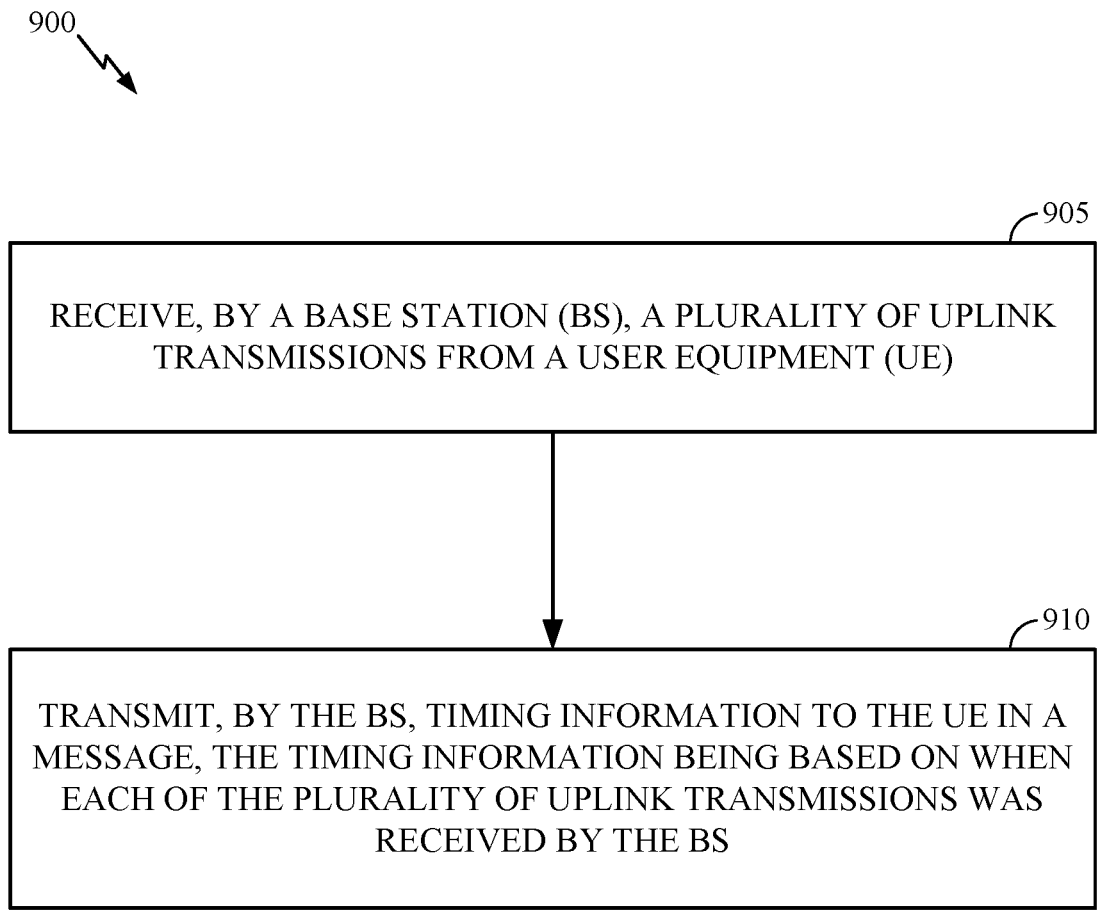
FIG. 9 is a flow diagram illustrating example operations by a BS for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110a in the wireless communication network 100). The operations 900 may be complimentary operations by the BS to the operations 900 performed by the UE. Operations 900 may be implemented as software components that are executed and run on one or more processors (e.g., processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 900 may begin, at 905, by receiving a plurality of uplink transmissions from a UE. For example, the BS may receive a plurality of uplink transmissions that were transmitted by the UE via different antennas, beams, and/or antenna panels. In some examples, the uplink transmissions were transmitted simultaneously (e.g., using a common TA) by the UE but arrive at the BS at different times.

The BS may determine timing information at which each of the plurality of uplink transmissions are received. For example, the BS may determine the relative times (e.g., time differences or offsets) that the plurality of uplink transmissions were received. In some examples, the BS determines TA commands, or relative TA commands, for different UE antennas, beams, and/or antenna panel. In some examples, the BS identifies the antenna(s), beam(s), and/or antenna panel(s) used for each of the plurality of uplink transmissions. For example, the BS may identify the different antennas, beams, and/or antenna panels based on various techniques including, but not limited to, a frequency, spreading code, identifier, or content used for each of the plurality of uplink transmissions. For example, the UE transmits the plurality of uplink transmissions using a particular frequency, spreading code, identifier, or content based on the antenna panel/beam being used. Thus, the BS can identify the antenna, beam, and/or antenna panel based on the associated parameter. According to certain aspects, the BS determines the TA commands, or relative TA commands, to account for the relative timing differences at which the plurality of uplink transmissions was received.

At 910, the BS transmits the timing information to the UE in a message (e.g., via DCI, a MAC-CE, and/or RRC signaling). The timing information being based on the times at which each of the plurality of uplink transmissions was received. Subsequently, the BS may receive another plurality of uplink transmissions from the UE with multiple TAs applied based on the timing information from the BS. The subsequent plurality of uplink transmissions may be received simultaneously (e.g., within a TTI) at the BS.

Figure 10:
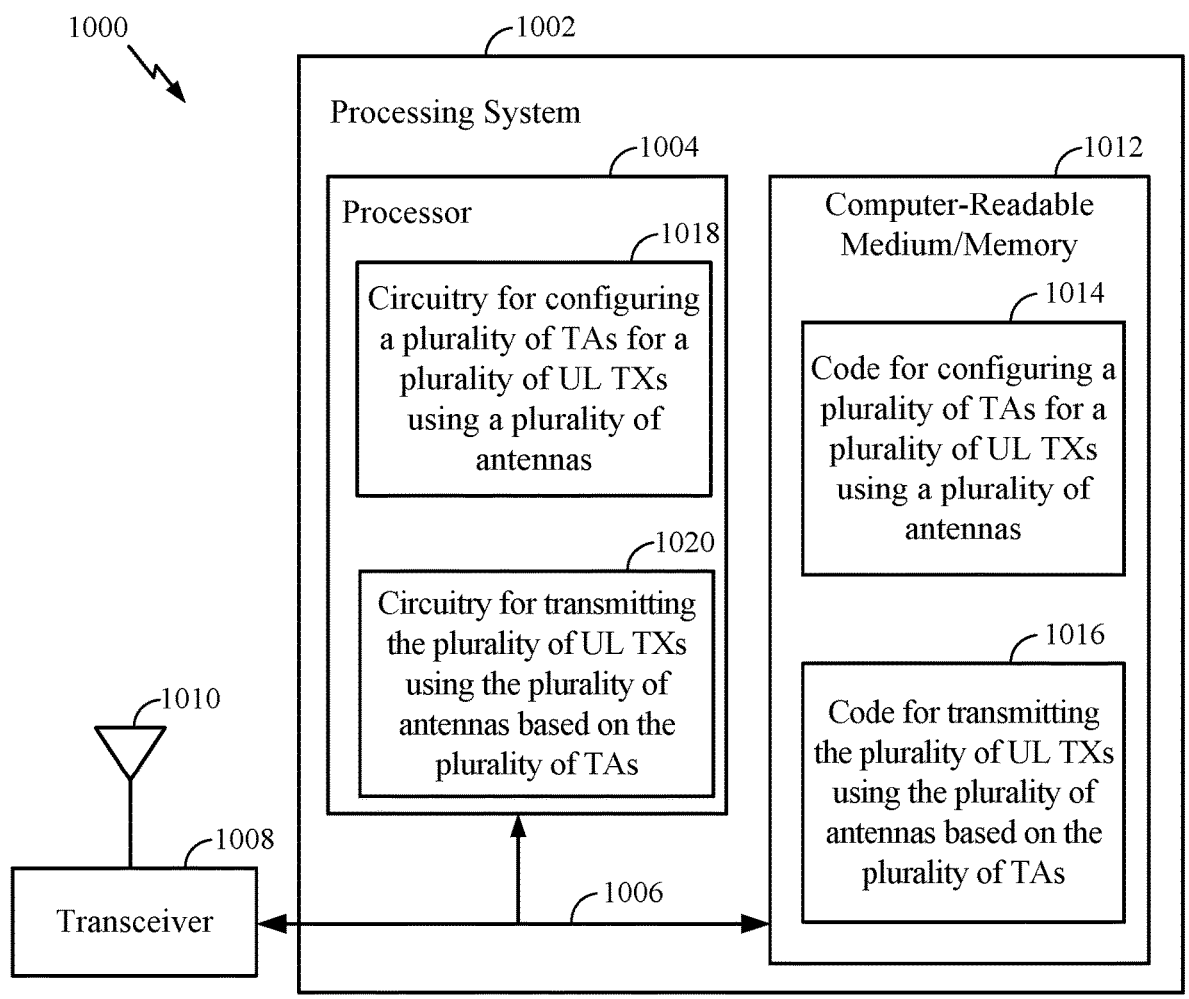
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein, for example, receiving relative timing information and/or transmitting a multi-panel uplink transmission. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for a using multiple timing advances for simultaneous uplink reception. In certain aspects, computer-readable medium/memory 1012 stores code 1014 for configuring a plurality of TAs for plurality of uplink transmissions using a plurality of antennas; and code 1016 for transmitting the plurality of uplink transmissions using the plurality of antennas based on the plurality of TAs. In certain aspects, the processor 1004 has circuitry configured to implement the code stored in the computer-readable medium/memory 1012. The processor 1004 includes circuitry 1018 for configuring a plurality of TAs for a plurality of uplink transmissions using a plurality of antennas; and circuitry 1020 for transmitting the plurality of uplink transmission using the plurality of antennas based on the plurality of TAs.

Figure 11:
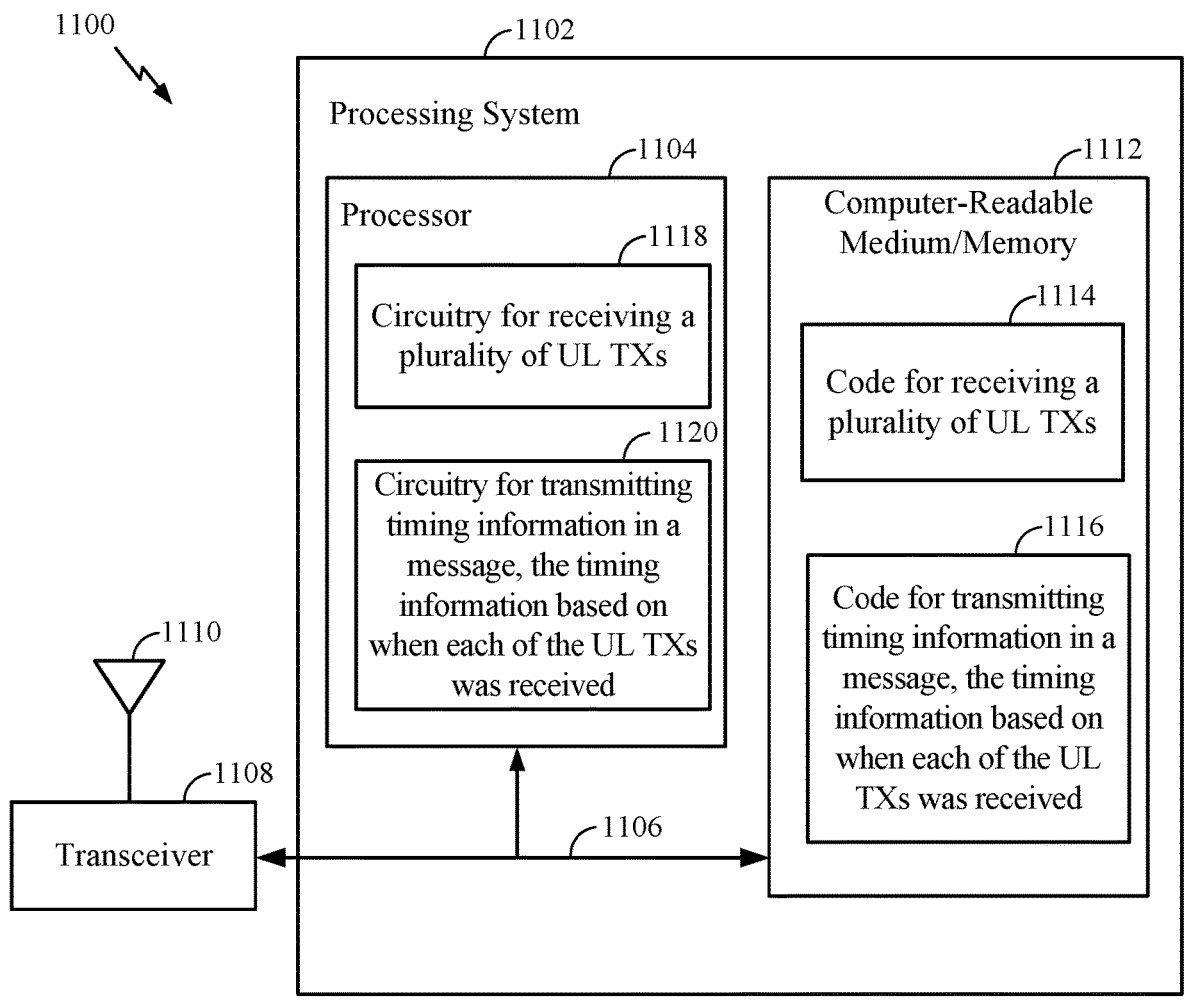
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for timing advances for uplink transmission. In certain aspects, computer-readable medium/memory 1112 stores code 1114 for receiving a plurality of uplink transmissions from a UE; and code 1116 for transmitting timing information to the UE in message, the timing information being based on when each of the plurality of uplink transmissions was received. In certain aspects, the processor 1104 has circuitry configured to implement the code stored in the computer-readable medium/memory 1112. The processor 1104 includes circuitry 1118 for receiving a plurality of uplink transmissions from a UE; and circuitry 1120 for transmitting timing information to the UE in message, the timing information being based on when each of the plurality of uplink transmissions was received.

EXAMPLE ASPECTS

In a first example aspect, a method for wireless communication by a user equipment (UE) includes configuring a plurality of timing advances for a plurality of uplink transmissions using a plurality of antennas; and transmitting the plurality of uplink transmissions to a base station (BS) using the plurality of antennas based on the plurality of timing advances.

In a second example aspect, in combination with the first example aspect, transmitting the plurality of uplink transmissions comprises transmitting the plurality of uplink transmissions concurrently.

In a third example aspect, in combination with one or more of the first or second aspects, the plurality of uplink transmissions is transmitted using the plurality of timing advances such that the plurality of uplink transmissions arrive at the BS in a same transmission time interval (TTI).

In a fourth example aspect, in combination with one or more of the first through third aspects, at least two of the plurality of timing advances are different.

In a fifth example aspect, in combination with one or more of the first through fourth aspects, the UE receives a message from the BS comprising an indication of the plurality of timing advances, wherein the plurality of timing advances are determined based on the indication from the BS.

In a sixth example aspect, in combination with one or more of the first through fifth aspects, the indication of the plurality of timing advances comprises timing information of previously received uplink transmissions associated with the plurality of antennas.

In a seventh example aspect, in combination with one or more of the first through sixth aspects, the message comprises downlink control information (DCI), a medium access control (MAC) control element (CE), or a radio resource control (RRC) configuration.

In an eighth example aspect, in combination with one or more of the first through third aspects, the plurality of antennas are located on a plurality of antenna panels for a plurality of different beam directions; and the plurality of uplink transmissions is transmitted using the plurality of antenna panels in the plurality of different beam directions.

In a ninth example aspect, a method for wireless communication by a base station (BS), includes receiving a plurality of uplink transmissions from a user equipment (UE); and transmitting timing information to the UE in a message, the timing information being based on when each of the plurality of uplink transmissions was received by the BS.

In a tenth example aspect, in combination with the ninth aspect, the BS identifies the plurality of uplink transmissions; and determines the timing information based, at least in part, on the identifying.

In an eleventh example aspect, in combination with one or more of the ninth or tenth aspects, the identifying is based on at least one of: a frequency, a spreading code, an identifier, content used for each of the plurality of uplink transmissions, or a combination thereof.

In an twelfth example aspect, in combination with one or more of the ninth through eleventh aspects, the BS identifies a plurality of UE antenna panels or UE antenna transmit beams associated with the plurality of uplink transmissions.

In a thirteenth example aspect, in combination with one or more of the ninth through twelfth aspects, the identifying is based on at least one of: a frequency, a spreading code, an identifier, content used for each of the plurality of uplink transmissions, or a combination thereof.

In a fourteenth example aspect, in combination with one or more of the ninth through thirteenth aspects, the timing information comprises a plurality of timing advance commands.

In a fifteenth example aspect, in combination with one or more of the ninth through fourteenth aspects, the BS determines the plurality of timing advance commands to account for timing differences at which the plurality of uplink transmissions were received.

In a sixteenth example aspect, in combination with one or more of the ninth through fifteenth aspects, the message comprises downlink control information (DCI), a medium access control (MAC) control element (CE), or a radio resource control (RRC) configuration.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks.

The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5 GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In an LTE or LTE-A network, a set of one or more base stations may define an eNodeB (eNB). In NR systems, the term "cell" and next generation NodeB (gNB or gNodeB), NR BS, 5G NB, access point (AP), or transmission reception point (TRP) may be interchangeable. A wireless multiple access communication system may include a number of distributed units (DUs) (e.g., edge units (EUs), edge nodes (ENs), radio heads (RHs), smart radio heads (SRHs), TRPs, etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8 and FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communication by a user equipment (UE), comprising:
   receiving timing information determined based on indicated timing information of previously received uplink transmissions associated with a plurality of antenna panels of the UE;
   configuring a timing advance for each of the plurality of antenna panels of the UE, wherein at least two of the antenna panels of the UE are configured with different timing advances; and
   transmitting a plurality of uplink transmissions concurrently to a base station (BS) using the plurality of antenna panels of the UE and the plurality of timing advances.

2. The method of claim 1, wherein transmitting the plurality of uplink transmissions comprises transmitting the plurality of uplink transmissions concurrently to the BS using the plurality of antenna panels of the UE and the plurality of timing advances, wherein each of the plurality uplink transmissions has a different signal path length from the UE to the BS.

3. The method of claim 1, wherein the plurality of uplink transmissions is transmitted using the plurality of timing advances such that the plurality of uplink transmissions arrive at the BS in a same transmission time interval (TTI).

4. The method of claim 1, wherein the timing information comprises downlink control information (DCI), a medium access control (MAC) control element (CE), or a radio resource control (RRC) configuration.

5. The method of claim 1, wherein:
   the plurality of antenna panels of the UE are configured in a plurality of different spatial directions; and
   the plurality of uplink transmissions is transmitted using the plurality of antenna panels of the UE with a plurality of beams in the plurality of different spatial directions.

6. The method of claim 1, further comprising:
   receiving signaling configuring the UE with a plurality of sounding reference signal (SRS) resources associated with the plurality of antenna panels of the UE; and
   receiving downlink control information (DCI) indicating the plurality of SRS resources for the plurality of uplink transmissions, wherein
   transmitting the plurality of uplink transmissions comprises, for each of the plurality of uplink transmissions, transmitting the uplink transmission using the antenna panel of the UE associated with the SRS resource and using the timing advance configured for the antenna panel of the UE.

7. A method for wireless communication by a base station (BS), comprising:
   receiving a plurality of uplink transmissions from a user equipment (UE); and
   transmitting timing information to the UE in a message, wherein the timing information is determined based on indicated timing information of previously received uplink transmissions associated with a plurality of antenna panels of the UE, wherein the timing information is for configuring, for the plurality of antennas panels of the UE, a plurality of timing advances, and wherein at least two of the antenna panels of the UE are configured with different timing advances.

8. The method of claim 7, further comprising:
   identifying the plurality of uplink transmissions; and
   determining the timing information based, at least in part, on the identifying.

9. The method of claim 8, wherein the identifying is based on at least one of: a frequency, a spreading code, an identifier, content used for each of the plurality of uplink transmissions, or a combination thereof.

10. The method of claim 7, further comprising identifying the plurality of antenna panels of the UE or a plurality of antenna transmit beams of the UE associated with the plurality of uplink transmissions.

11. The method of claim 10, wherein the identifying is based on at least one of: a frequency, a spreading code, an identifier, content used for each of the plurality of uplink transmissions, or a combination thereof.

12. The method of claim 7, wherein the timing information comprises a plurality of timing advance commands.

13. The method of claim 12, further comprising determining the plurality of timing advance commands to account for timing differences at which the plurality of uplink transmissions were received.

14. The method of claim 7, wherein the message comprises downlink control information (DCI), a medium access control (MAC) control element (CE), or a radio resource control (RRC) configuration.

15. An apparatus for wireless communication, comprising:
   a plurality of antennas configured in a plurality of antenna panels;
   a memory; and
   at least one processor coupled with the memory, the processor and memory configured to:
      receive timing information determined based on indicated timing information of previously received uplink transmissions associated with a plurality of antenna panels at the apparatus;
      configure a plurality of timing advances for the plurality of antenna panels at the apparatus, wherein at least two of the antenna panels are configured with different timing advances; and
      transmit a plurality of uplink transmissions concurrently to another apparatus using the plurality of antenna panels and the plurality of timing advances.

16. The apparatus of claim 15, wherein the plurality of antenna panels are configured to transmit the plurality of uplink transmissions concurrently to the other apparatus using the plurality of antenna panels at the apparatus and the plurality of timing advances, wherein each of the plurality uplink transmissions has a different signal path length from the apparatus to the other apparatus.

17. The apparatus of claim 15, wherein the plurality of antenna panels are configured to transmit the plurality of uplink transmissions using the plurality of timing advances such that the plurality of uplink transmissions arrives at the other apparatus in a same transmission time interval (TTI).

18. The apparatus of claim 15, wherein:
   one or more of the plurality of antennas are further configured to receive a message from the other apparatus comprising an indication of the plurality of timing advances; and
   the memory and processor are further configured to determine the plurality of timing advances based on the indication from the other apparatus.

19. The apparatus of claim 18, wherein the indication of the plurality of timing advances comprises timing information of previously received uplink transmissions associated with the plurality of antenna panels.

20. The apparatus of claim 15, wherein:
the plurality of antenna panels are configured in a plurality of different spatial directions; and
the memory and processor are configured to transmit the plurality of uplink transmissions using the plurality of antenna panels with a plurality of beams in the plurality of different spatial directions.

21. An apparatus for wireless communication, comprising:
a memory; and
at least one processor coupled with the memory, the processor and memory configured to:
receive a plurality of concurrent uplink transmissions from another apparatus via a plurality of antenna panels configured with a plurality of corresponding timing advances; and
transmit timing information to the other apparatus in a message, wherein the timing information is determined based on indicated timing information of previously received uplink transmissions associated with the plurality of antenna panels of the other apparatus, wherein the timing information is for configuring, for the plurality of antennas panels at the other apparatus, the plurality of timing advances, and wherein at least two of the antenna panels are configured with different timing advances.

22. The apparatus of claim 21, wherein the memory and processor are configured to:
identify the plurality of concurrent uplink transmissions; and
determine the timing information based, at least in part, on the identifying.

23. The apparatus of claim 22, wherein the memory and processor are configured to identify the plurality of concurrent uplink transmissions based on at least one of: a frequency, a spreading code, an identifier, content used for each of the plurality of concurrent uplink transmissions, or a combination thereof.

24. The apparatus of claim 21, wherein the memory and processor are configured to identify the plurality of antenna panels associated with the plurality of concurrent uplink transmissions or a plurality of antenna transmit beams of the other apparatus associated with the plurality of concurrent uplink transmissions.

25. The apparatus of claim 24, wherein the memory and processor are configured to identify the plurality of antenna panels based on at least one of: a frequency, a spreading code, an identifier, content used for each of the plurality of concurrent uplink transmissions, or a combination thereof.

26. The apparatus of claim 21, wherein the timing information comprises a plurality of timing advance commands.

27. The apparatus of claim 26, wherein the memory and processor are configured to determine the plurality of timing advance commands to account for timing differences at which the plurality of concurrent uplink transmissions was received.

28. An apparatus for wireless communication, comprising:
means for receiving timing information determined based on indicated timing information of previously received uplink transmissions associated with a plurality of antenna panels at the apparatus;
means for configuring a timing advance for each of a plurality of antenna panels at the apparatus, wherein at least two of the antenna panels are configured with different timing advances; and
means for transmitting a plurality of uplink transmissions concurrently to another apparatus using the plurality of antenna panels and the plurality of timing advances.

29. An apparatus for wireless communication, comprising:
means for receiving a plurality of concurrent uplink transmissions from another apparatus via a plurality of antenna panels configured with a plurality of corresponding timing advances; and
means for transmitting timing information to the other apparatus in a message, wherein the timing information is determined based on indicated timing information of previously received uplink transmissions associated with the plurality of antenna panels of the other apparatus and the timing information is for configuring, for the plurality of antennas panels at the other apparatus, the plurality of corresponding timing advances, and wherein at least two of the antenna panels are configured with different timing advances.

30. A non-transitory computer readable medium storing computer executable code thereon for wireless communication by a user equipment (UE), comprising:
code for receiving timing information determined based on indicated timing information of previously received uplink transmissions associated with a plurality of antenna panels of the UE;
code for configuring a timing advance for each of a plurality of antenna panels of the UE, wherein at least two of the antenna panels of the UE are configured with different timing advances; and
code for transmitting a plurality of concurrent uplink transmissions concurrently to a base station (BS) using the plurality of antenna panels of the UE and the plurality of timing advances.

31. A non-transitory computer readable medium storing computer executable code thereon for wireless communication by a base station (BS), comprising:
code for receiving a plurality of concurrent uplink transmissions from a user equipment (UE) via a plurality of antenna panels of the UE configured with a plurality of corresponding timing advances; and
code for transmitting timing information to the UE in a message, wherein the timing information is determined based on indicated timing information of previously received uplink transmissions associated with the plurality of antenna panels of the UE and the timing information is for configuring, for the plurality of antennas panels of the UE, the plurality of timing advances, and wherein at least two of the antenna panels of the UE are configured with different timing advances.

* * * * *